United States Patent
Balasubramanian et al.

(10) Patent No.: US 12,184,786 B2
(45) Date of Patent: Dec. 31, 2024

(54) PHYSICAL LAYER SECURITY FOR USER EQUIPMENT TO USER EQUIPMENT RELAYS

(71) Applicant: QUALCOMM Incorporated, San Diego, CA (US)

(72) Inventors: Anantharaman Balasubramanian, San Diego, CA (US); Hong Cheng, Basking Ridge, NJ (US); Kapil Gulati, Belle Mead, NJ (US); Shuanshuan Wu, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 17/811,225

(22) Filed: Jul. 7, 2022

(65) Prior Publication Data
US 2024/0015024 A1    Jan. 11, 2024

(51) Int. Cl.
*H04L 9/32* (2006.01)
*H04L 9/08* (2006.01)
*H04W 88/04* (2009.01)

(52) U.S. Cl.
CPC .......... *H04L 9/3242* (2013.01); *H04L 9/0838* (2013.01); *H04L 9/3247* (2013.01); *H04W 88/04* (2013.01)

(58) Field of Classification Search
CPC .... H04L 9/3242; H04L 9/3247; H04L 9/0838
See application file for complete search history.

(56) References Cited

U.S. PATENT DOCUMENTS

| | | | |
|---|---|---|---|
| 2016/0127897 A1* | 5/2016 | Lee | H04W 12/04 455/410 |
| 2017/0195877 A1 | 7/2017 | Lehtovirta et al. | |
| 2020/0236554 A1* | 7/2020 | Lee | H04W 12/121 |

(Continued)

FOREIGN PATENT DOCUMENTS

| WO | WO-2017189590 A1 * | 11/2017 | H04L 9/0838 |
|---|---|---|---|
| WO | 2022014870 A1 | 1/2022 | |

OTHER PUBLICATIONS

"3rd Generation Partnership Project; Technical Specification Group Services and System Aspects; Study on security aspects of enhancement for proximity based services in the 5G System (5GS) (Release 17) ", 3GPP TR 33.847 V17.1.0, 33847-H10, 3rd Generation Partnership Project, Mobile Competence Centre, 650, Route Des Lucioles, F-06921 Sophia-Antipolis Cedex, France , Mar. 23, 2022, pp. 1-166, XP052193855, Sections 6.6, 6.8, 6 .16, 6.20-6.23, 6.32-6.32.

(Continued)

*Primary Examiner* — Nicholas P Celani
(74) *Attorney, Agent, or Firm* — Harrity & Harrity, LLP

(57) ABSTRACT

Various aspects of the present disclosure generally relate to wireless communication. In some aspects, a user equipment (UE) may relay sidelink data between a first remote UE and a second remote UE. The UE may facilitate end-to-end physical layer security for the sidelink data relayed between the first remote UE and the second remote UE based at least in part on a first link key associated with a first link between the first remote UE and the UE and a second link key associated with a second link between the UE and the second remote UE. Numerous other aspects are described.

30 Claims, 11 Drawing Sheets

(56) References Cited

U.S. PATENT DOCUMENTS

2022/0007242 A1    1/2022  Zhou et al.
2023/0254692 A1*   8/2023  Kim .................... H04W 12/61
                                                    726/6

OTHER PUBLICATIONS

Ericsson: "ProSe: key management for UE-to-Network Relay and Remote UE", 3GPP TSG-SA3 Meeting #100bis-e, S3-202583, 3rd Generation Partnership Project, Mobile Competence Centre, 650, Route Des Lucioles, F-06921 Sophia-Antipolis Cedex, France, vol. SA WG3, No. e-meeting, Oct. 12, 2020-Oct. 16, 2020, Oct. 2, 2020, 4 Pages, XP051937884, pp. 2-3.
International Search Report and Written Opinion—PCT/US2023/069396—ISA/EPO—Oct. 5, 2023.

* cited by examiner

PHYSICAL LAYER SECURITY FOR USER EQUIPMENT TO USER EQUIPMENT RELAYS

FIELD OF THE DISCLOSURE

Aspects of the present disclosure generally relate to wireless communication and to techniques and apparatuses for physical layer security for user equipment to user equipment relays.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to relay sidelink data between a first remote UE and a second remote UE. The one or more processors may be configured to facilitate end-to-end physical layer security for the sidelink data relayed between the first remote UE and the second remote UE based at least in part on a first link key associated with a first link between the first remote UE and the UE and a second link key associated with a second link between the UE and the second remote UE.

Some aspects described herein relate to a method of wireless communication performed by a UE. The method may include relaying sidelink data between a first remote UE and a second remote UE. The method may include facilitating end-to-end physical layer security for the sidelink data relayed between the first remote UE and the second remote UE based at least in part on a first link key associated with a first link between the first remote UE and the UE and a second link key associated with a second link between the UE and the second remote UE.

Some aspects described herein relate to a non-transitory computer-readable medium that stores a set of instructions for wireless communication by a UE. The set of instructions, when executed by one or more processors of the UE, may cause the UE to relay sidelink data between a first remote UE and a second remote UE. The set of instructions, when executed by one or more processors of the UE, may cause the UE to facilitate end-to-end physical layer security for the sidelink data relayed between the first remote UE and the second remote UE based at least in part on a first link key associated with a first link between the first remote UE and the UE and a second link key associated with a second link between the UE and the second remote UE.

Some aspects described herein relate to an apparatus for wireless communication. The apparatus may include means for relaying sidelink data between a first remote UE and a second remote UE. The apparatus may include means for facilitating end-to-end physical layer security for the sidelink data relayed between the first remote UE and the second remote UE based at least in part on a first link key associated with a first link between the first remote UE and the apparatus and a second link key associated with a second link between the apparatus and the second remote UE.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
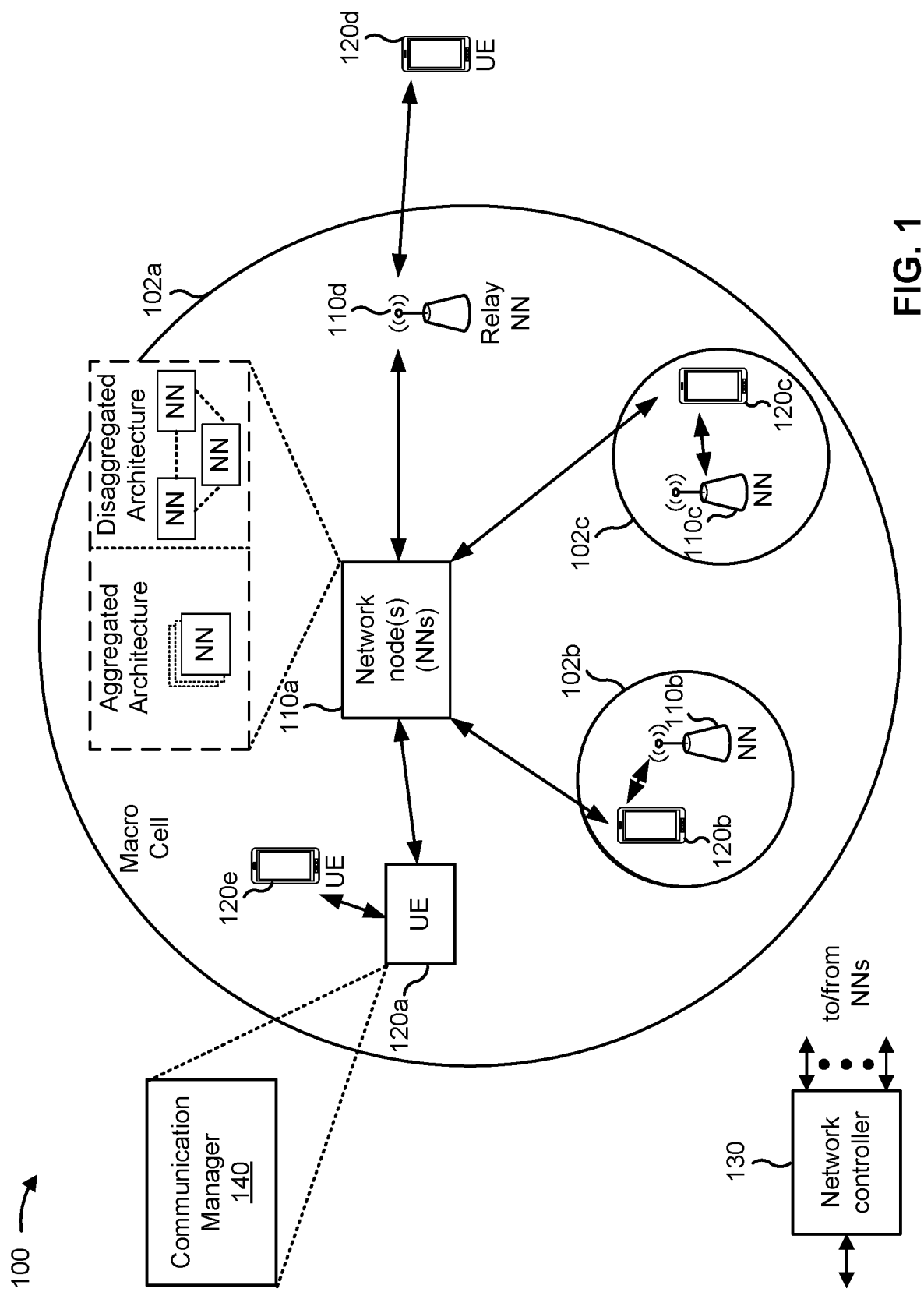
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may relay sidelink data between a first remote UE and a second remote UE; and facilitate end-to-end physical layer security for the sidelink data relayed between the first remote UE and the second remote UE based at least in part on a first link key associated with a first link between the first remote UE and the UE 120 and a second link key associated with a second link between the UE 120 and the second remote UE. Additionally, or alternatively, the communication manager 140 may perform one or more other operations described herein.

As indicated above, FIG. 1 is provided as an example. Other examples may differ from what is described with regard to FIG. 1.

Figure 2:
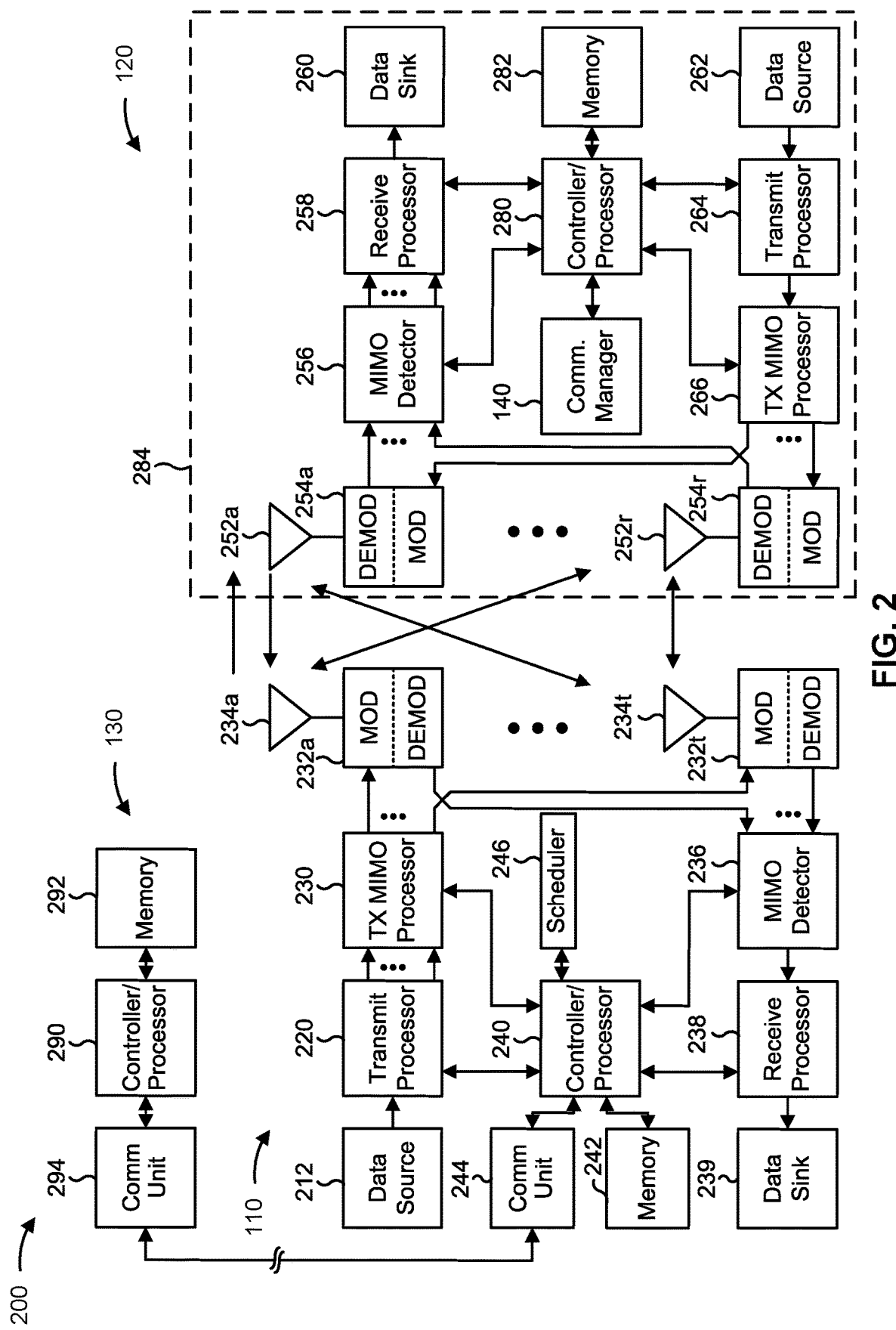
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network node 110, the controller/processor 280 of the UE 120, and/or any other component(s) of FIG. 2 may perform one or more techniques associated with physical layer security for UE-to-UE relays, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., UE 120) includes means for relaying sidelink data between a first remote UE and a second remote UE; and/or means for facilitating end-to-end physical layer security for the sidelink data relayed between the first remote UE and the second remote UE based at least in part on a first link key associated with a first link between the first remote UE and the UE and a second link key associated with a second link between the UE and the second remote UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
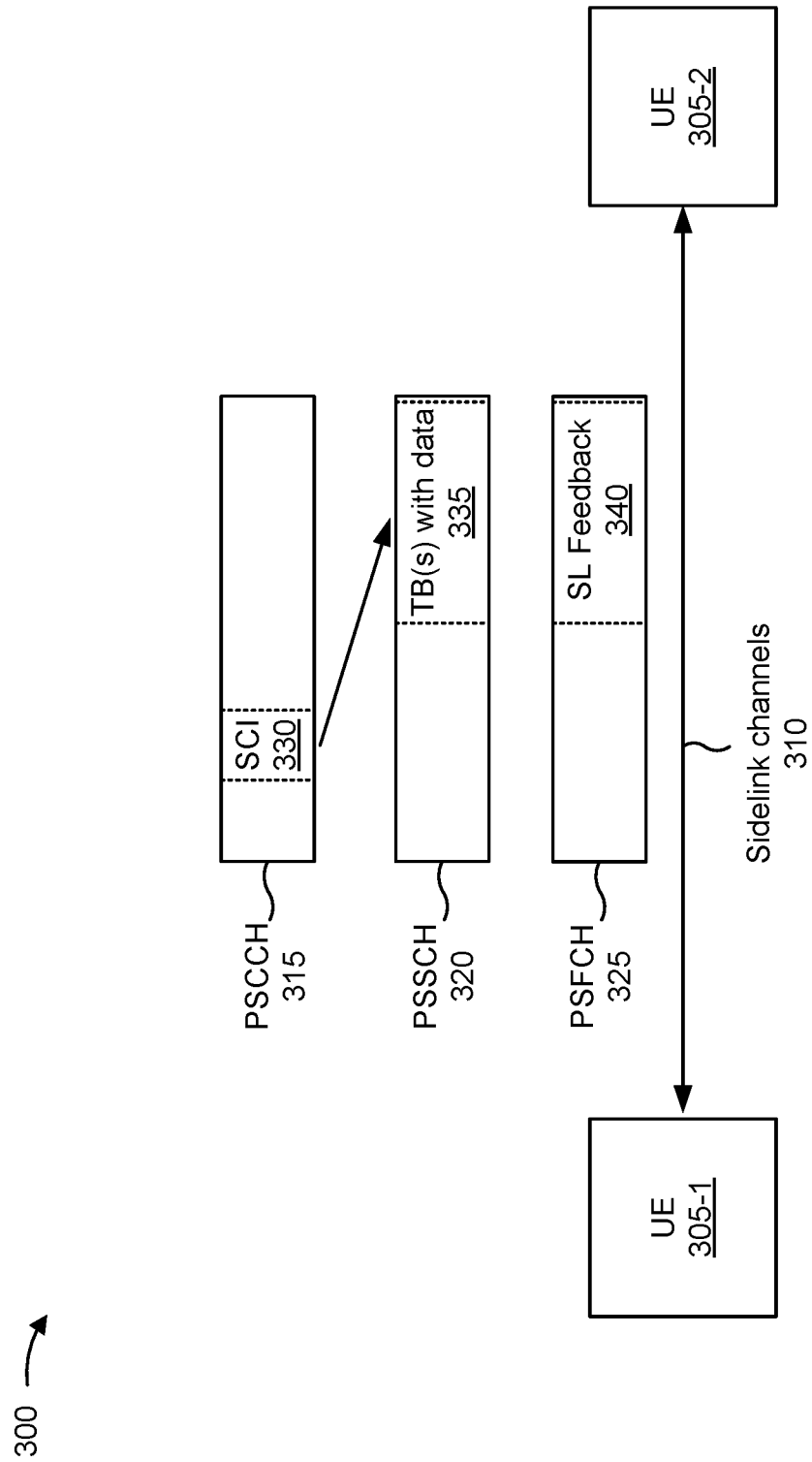
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink resource allocation mode (e.g., Mode 1) where resource selection and/or scheduling is performed by a network node 110. For example, the UE 305 may receive a grant (e.g., in downlink control information (DCI) or in a radio resource control (RRC) message, such as for configured grants) from the network node 110 for sidelink channel access and/or scheduling. In some aspects, a UE 305 may operate using a resource allocation mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the resource allocation mode where resource selection and/or scheduling is performed by a UE 305 (e.g., Mode 2), the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
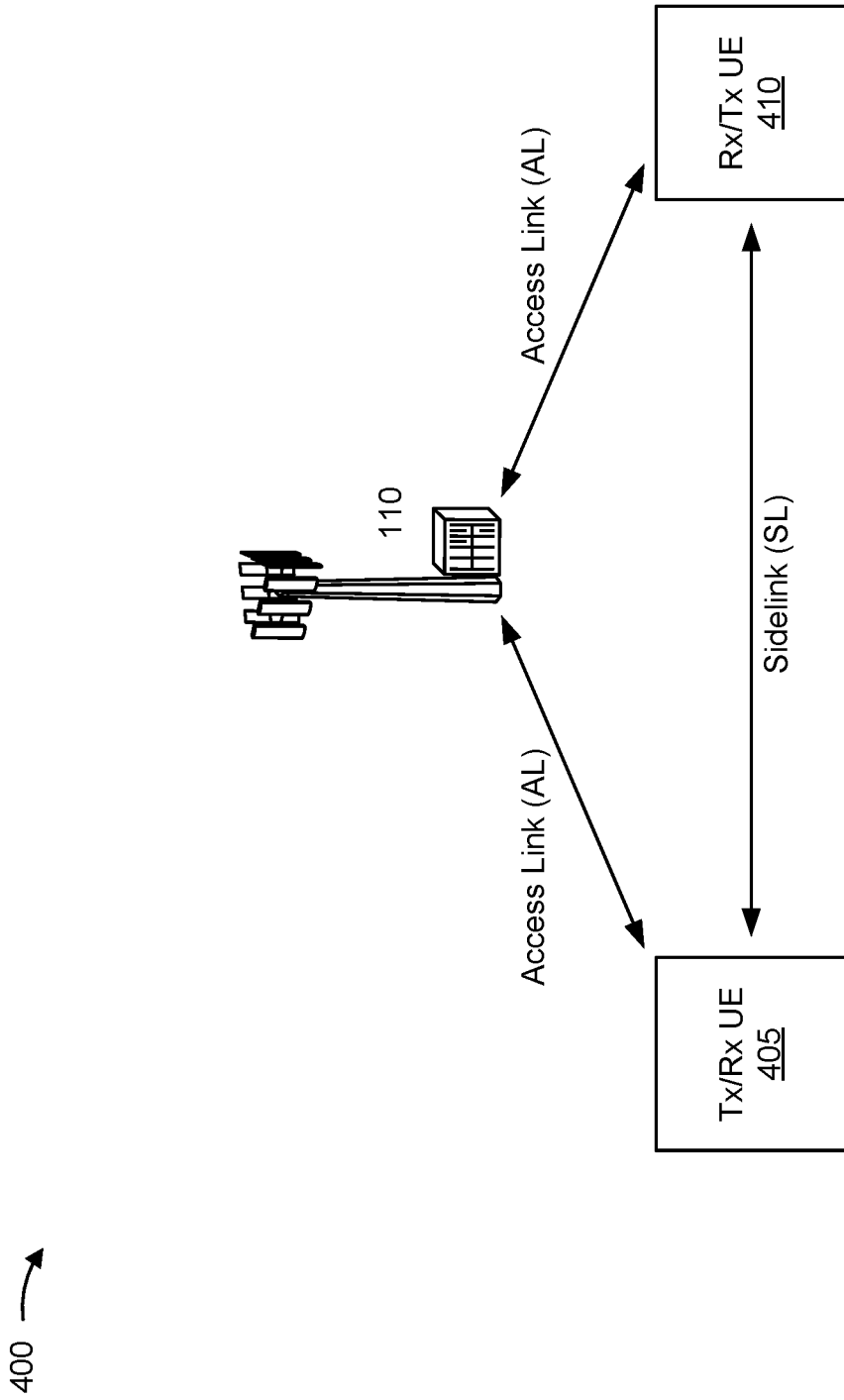
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a network node 110 may communicate with the Tx/Rx UE 405 via a first access link. Additionally, or alternatively, in some sidelink modes, the network node 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a network node 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 4 is provided as an example. Other examples may differ from what is described with respect to FIG. 4.

Figure 5:
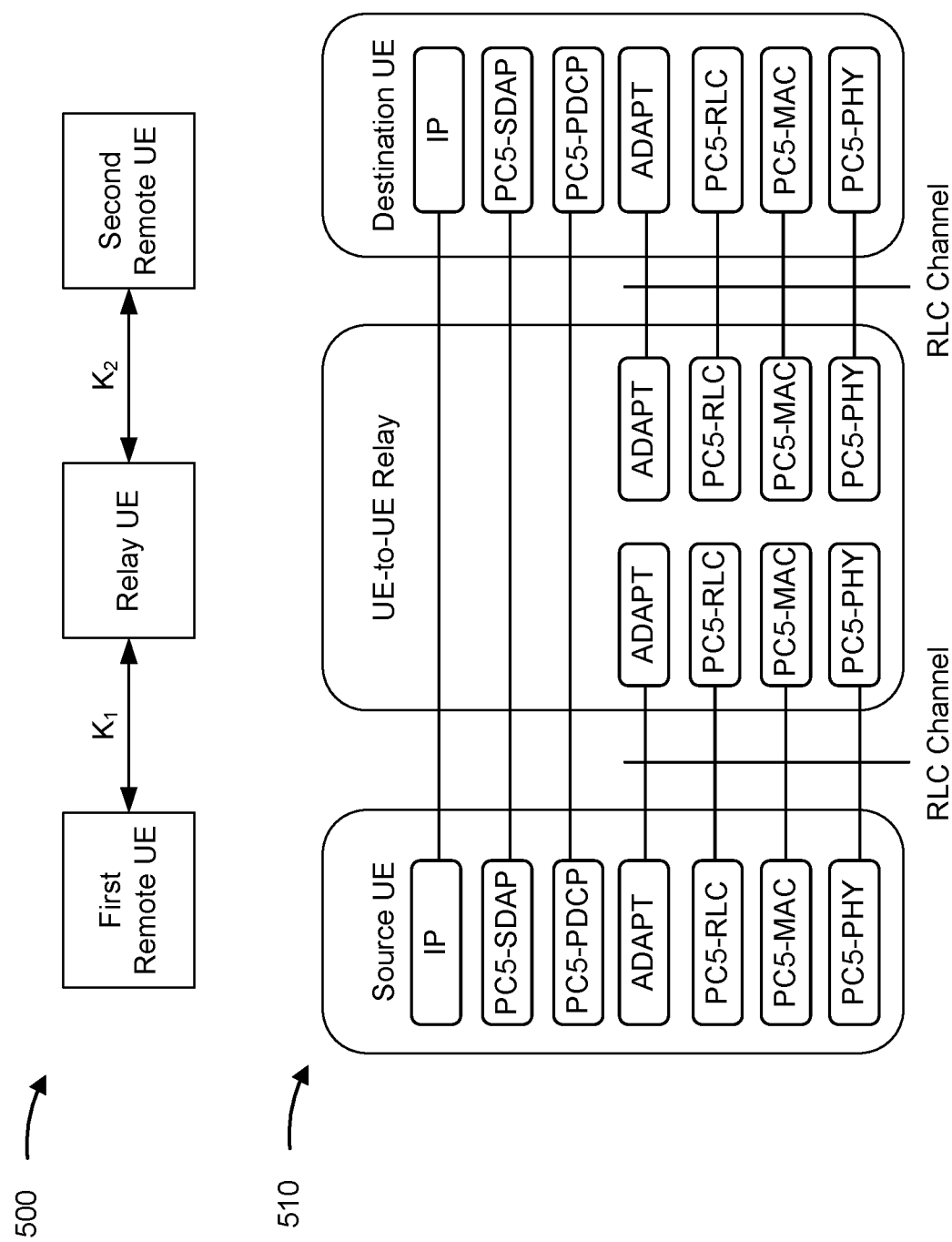
FIG. 5 is a diagram illustrating an example of a UE-to-UE relay and an example of a protocol stack for a UE-to-UE relay, in accordance with the present disclosure.

FIG. 5 is a diagram illustrating an example 500 of a UE-to-UE relay and an example 510 of a protocol stack for a UE-to-UE relay, in accordance with the present disclosure. In a UE-to-UE relay, a relay device may relay communications between two remote UEs. As shown in example 500 of FIG. 5, a relay UE may relay sidelink communications between a first remote UE and a second remote UE. The first remote UE and the relay UE may establish a connection, and a first link key $K_1$ may be established for the link between the first remote UE and the relay UE. The second remote UE and the relay UE may also establish a connection, and a second link key $K_2$ may be established for the link between the second remote UE and the relay UE. The first link key $K_1$ and the second link key $K_2$ may be higher layer keys (e.g., packet data convergence protocol (PDCP) layer keys, which provide security at the PDCP layer), which may be independently established using certificate exchanges.

Example 510 of FIG. 5 shows an example of a protocol stack for a one hop UE-to-UE layer 2 (L2) relay architecture for relaying communications between a source UE and a destination UE. For example, the source UE may correspond to the first remote UE, the destination UE may correspond to the second remote UE, and the UE-to-UE relay may correspond to the relay UE. As shown in example 510, the protocol stack for the UE-to-UE relay architecture may include, in the source UE and the target UE, an internet protocol (IP) layer, a PC5 service data adaptation protocol (SDAP) layer, a PC5 PDCP layer, an adaption (ADAPT) layer, a PC5 radio link control (RLC) layer, a PC5 medium access control (MAC) layer, and a PC5 physical (PHY) layer.

Communications associated with the IP layer, the SDAP layer, and the PDCP layer may be between the corresponding layers in the source UE and the destination UE. Communications associated with the PHY layer, the MAC layer, the RLC layer, and the ADAPT layer may be between corresponding layers in the source UE and the UE-to-UE relay (e.g., via an RLC channel) and between corresponding layers in the UE-to-UE relay and the destination UE (e.g., via an RLC channel).

In some examples, security (e.g., per-link security) may be provided at a higher layer, such as the PDCP layer. When the source and destination UEs establish a connection and are in L2 relay mode (e.g., after connection establishment), source-to-destination security (e.g., PDCP layer security) may apply to PC5 communications between the source and destination UEs. When an end-to-end connection is being established, source-to-relay and relay-to-destination links may be independently secured (e.g., with higher layer security keys $K_1$ and $K_2$). However, during this phase, there is no notion of end-to-end security. Furthermore, because relaying does not support PDCP (as shown in example 510), per-link (e.g., source-relay and relay-destination) higher layer security may not be used for relayed communications prior to, and during, establishment of source-destination end-to-end security.

Some techniques and apparatuses described herein enable a UE (e.g., a relay UE) to facilitate end-to-end PHY layer security for UE-to-UE relays between a first remote UE and a second remote UE. The UE may relay sidelink data between the first remote UE and the second remote UE, and the UE may facilitate end-to-end PHY layer security for the sidelink data relayed between the first remote UE and the second remote UE based at least in part on a first link key associated with the first link between the first remote UE and a second link key associated with a second link between the UE and the second remote UE. As a result, the end-to-end PHY layer security may secure sidelink communications that are relayed between the first remote UE and the second remote UE prior to, and during, establishment of an end-to-end connection between the first remote UE and the second remote UE. This may enable authentication of sidelink communications relayed, by the UE, between the first remote UE and the second remote UE, which may result in improved security for UE-to-UE relays.

As indicated above, FIG. 5 is provided as an example. Other examples may differ from what is described with respect to FIG. 5.

Figure 6:
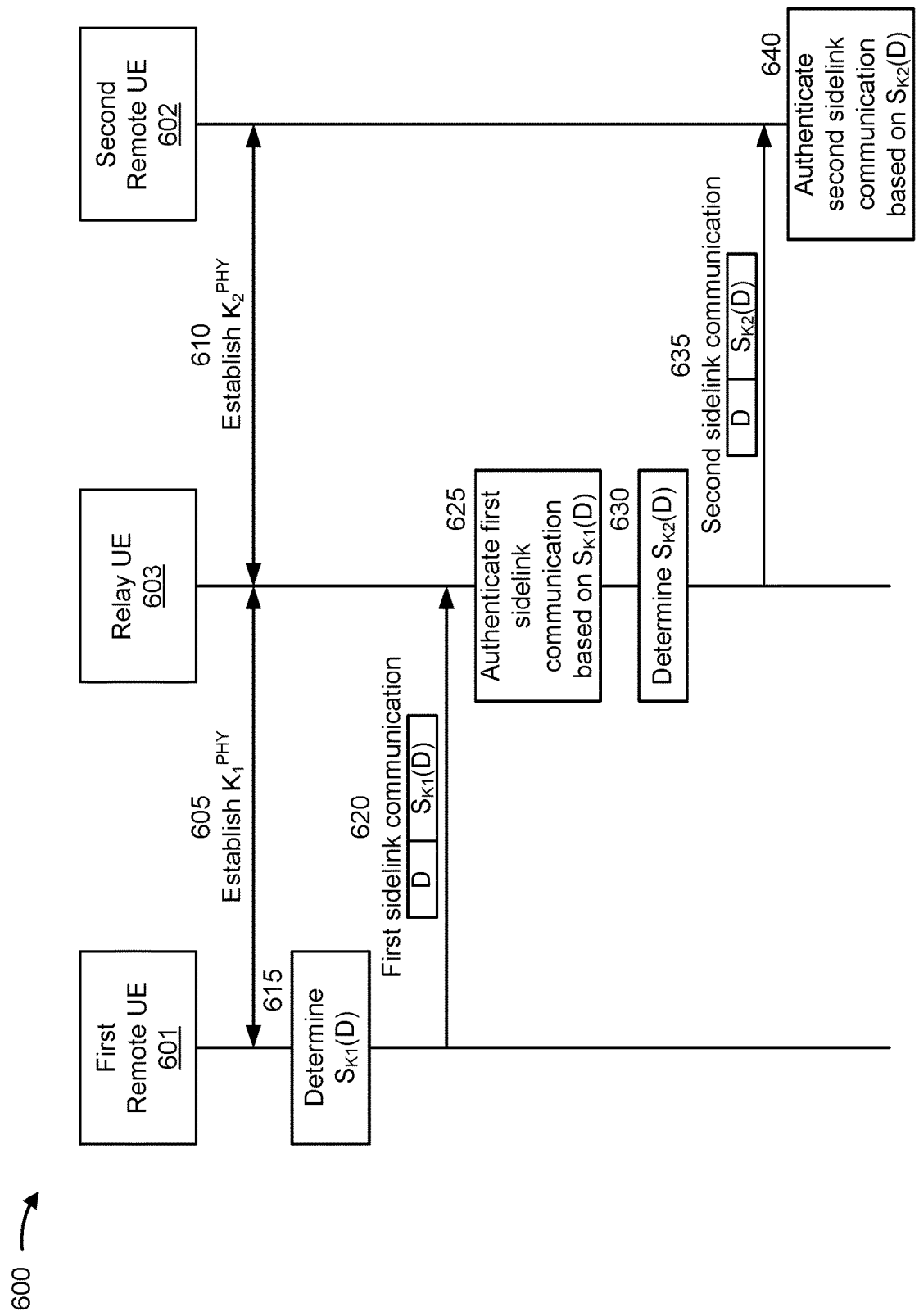
FIGS. 6-9 are a diagrams illustrating examples associated with physical layer security for UE-to-UE relays, in accordance with the present disclosure.

FIG. 6 is a diagram illustrating an example 600 associated with PHY layer security for UE-to-UE relays, in accordance with the present disclosure. As shown in FIG. 6, example 600 includes communication between a first remote UE 601, a second remote UE 602, and a relay UE 603. In some aspects, the first remote UE 601, the second remote UE 602, and the relay UE 603 may correspond to one or more other UEs described elsewhere herein, such as UE 120. In some aspects, the first remote UE 601, the second remote UE 602, and the relay UE 603 may communicate via sidelink communications (e.g., over a PC5 interface). As shown in example 600, in some aspects, the relay UE 603 may facilitate end-to-end PHY layer security for sidelink data relayed between the first remote UE 601 and the second remote UE 602 using per-hop authentication of transmitted sidelink communications.

As shown in FIG. 6, and by reference number 605, the relay UE 603 and the first remote UE 601 may establish a first PHY layer key $K_1^{PHY}$ based at least in part on a first link key $K_1$ associated with a first link between the first remote UE 601 and the relay UE 603. The first link key $K_1$ may be an established higher layer (e.g., PDCP layer) key for the first link between the first remote UE 601 and the relay UE 603. For example, the first remote UE 601 and the relay UE 603 may establish the higher layer key $K_1$ (e.g., by exchanging certificates) when establishing a sidelink connection between the first remote UE 601 and the relay UE 603. The first PHY layer key $K_1^{PHY}$ may be a lower layer (e.g., PHY layer) key derived based at least in part on the first link key $K_1$. In some aspects, the first remote UE 601 and the relay UE 603 may each derive the first PHY layer key $K_1^{PHY}$, based at least in part on the first link key $K_1$ and a slot number, as $K_1^{PHY}$=KDF($K_1$, slot #), where KDF is a key derivation function.

As shown in FIG. 6, and by reference number 610, the relay UE 603 and the second remote UE 602 may establish a second PHY layer key $K_2^{PHY}$ based at least in part on a second link key $K_2$ associated with a second link between the second remote UE 602 and the relay UE 603. The second link key $K_2$ may be an established higher layer (e.g., PDCP layer) key for the second link between the second remote UE 602 and the relay UE 603. For example, the second remote UE 602 and the relay UE 603 may establish the higher layer key $K_2$ (e.g., by exchanging certificates) when establishing a sidelink connection between the second remote UE 602 and the relay UE 603. The second PHY layer key $K_2^{PHY}$ may be a lower layer (e.g., PHY layer) key derived based at least in part on the second link key $K_2$. In some aspects, the second remote UE 602 and the relay UE 603 may each derive the second PHY layer key $K_2^{PHY}$, based at least in part on the second link key $K_2$ and a slot number, as $s_{K_2}^{PHY}$=KDF($K_2$, slot #), where KDF is the key derivation function.

As shown in FIG. 6, and by reference number 615, the first remote UE 601 may determine a first message authentication code for authenticating sidelink data to be transmitted from the first remote UE 601 to the relay UE 603, and relayed from the relay UE 603 to the second remote UE 602. In some aspects, the first message authentication code determined by the first remote UE 601 may be derived based at least in part on the first link key $K_1$. For example, the first remote UE 601 may determine the first message authentication code $s_{K_1}(D)$ for sidelink data D (e.g., PHY layer data) to be transmitted, based at least in part on the first PHY layer key $K_1^{PHY}$ and the sidelink data D, as $s_{K_1}(D)=f(K_1^{PHY}, D)$, where $f$ may be any standardized one-way mapping function. In this case, the first message authentication code $s_{K_1}(D)$ may be a digital signature that can be used to authenticate the source of the sidelink data.

As shown in FIG. 6, and by reference number 620, the first remote UE 601 may transmit, to the relay UE 603, a first sidelink communication that includes the sidelink data D and the first message authentication code $s_{K_1}(D)$. For example, the first sidelink communication may be an extended sidelink message (e.g., $d_1=[D, s_{K_1}(D)]$), in which the first message authentication code $s_{K_1}(D)$ is included with the sidelink data D.

The relay UE 603 may receive the first sidelink communication transmitted by the first remote UE 601. The relay UE 603 may decode the first sidelink communication, and the relay UE 603 may determine, from a destination identifier (ID) indicated in the first sidelink communication (e.g., in SCI), whether the first sidelink communication is to be relayed to the second remote UE 602.

As shown in FIG. 6, and by reference number 625, the relay UE 603 may authenticate the first sidelink communication based at least in part on the first message authentication code $s_{K_1}(D)$. For example, the relay UE 603 may perform the authentication of the first sidelink communication in connection with a determination (e.g., from the destination ID) that the first sidelink communication is to be relayed to the second remote UE 602. In some aspects, the relay UE 603 may determine a derived first message authentication code $\widehat{s_{K_1}} = f(K_1^{PHY}, D)$ from the data D received in the first sidelink communication and the first PHY layer key $K_1^{PHY}$. The relay UE 603 may authenticate the first sidelink communication (e.g., authenticate that the first remote UE 601 is the source of the first sidelink communication) by comparing the derived first message authentication code $\widehat{s_{K_1}}$ with the first message authentication code $s_{K_1}$ included in the first sidelink communication to verify whether the derived first message authentication code $\widehat{s_{K_1}}$ matches the first message authentication code $s_{K_1}$ included in the first sidelink communication. In some aspects, the relay UE 603 may proceed with the operations shown in FIG. 6 in connection with a determination that there is a match between $\widehat{s_{K_1}}$ and $s_{K_1}$. In a case in which $\widehat{s_{K_1}}$ does not match $s_{K_1}$, the relay UE 603 may discard the first sidelink communication without relaying the sidelink data to the second remote UE 602.

As shown in FIG. 6, and by reference number 630, the relay UE 603 may determine a second message authentication code $s_{K_2}$ for the data D received in the first sidelink communication. For example, the relay UE 603 may discard the first message authentication code $s_{K_1}$, and the relay UE 603 may determine a new message authentication code (e.g., the second message authentication code $s_{K_2}$) for the second link between the relay UE 603 and the second remote UE 602. In some aspects, the second message authentication code $s_{K_2}$ may be derived based at least in part on the second link key $K_2$. For example, the relay UE 603 may determine the second message authentication code $s_{K_2}(D)$ for the sidelink data D, based at least in part on the second PHY layer key $K_2^{PHY}$ and the sidelink data D, as $s_{K_2}(D) = f(K_2^{PHY}, D)$.

As shown in FIG. 6, and by reference number 635, the relay UE 603 may transmit, to the second remote UE 602, a second sidelink communication that includes the sidelink data D (e.g., the sidelink data received by the relay UE 603 in the first sidelink communication) and the second message authentication code $s_{K_2}(D)$. For example, the second sidelink communication may be a sidelink message (e.g., $d_2 = [D, s_{K_2}(D)]$), in which the second message authentication code $s_{K_2}(D)$ is included with the sidelink data D. The second remote UE 602 may receive the second sidelink communication transmitted by the relay UE 603.

As shown in FIG. 6, and by reference number 640, the second remote UE 602 may authenticate the second sidelink communication based at least in part on $s_{K_2}(D)$. In some aspects, the second remote UE 602 may determine a derived second message authentication code $\widehat{s_{K_2}} = f(K_2^{PHY}, D)$ from the data D received in the second sidelink communication and the second PHY layer key $K_2^{PHY}$. The second remote UE 602 may authenticate the second sidelink communication by comparing the derived second message authentication code $\widehat{s_{K_2}}$ with the second message authentication code $s_{K_2}$ included in the second sidelink communication to verify whether the derived second message authentication code $\widehat{s_{K_2}}$ matches the second message authentication code $s_{K_2}$ included in the second sidelink communication. The second remote UE 602 may determine that the sidelink data has been relayed from the first remote UE 601 based at least in part on the source ID indicated in the control channel (e.g., the SCI).

As indicated above, FIG. 6 is provided as an example. Other examples may differ from what is described with respect to FIG. 6.

Figure 7:
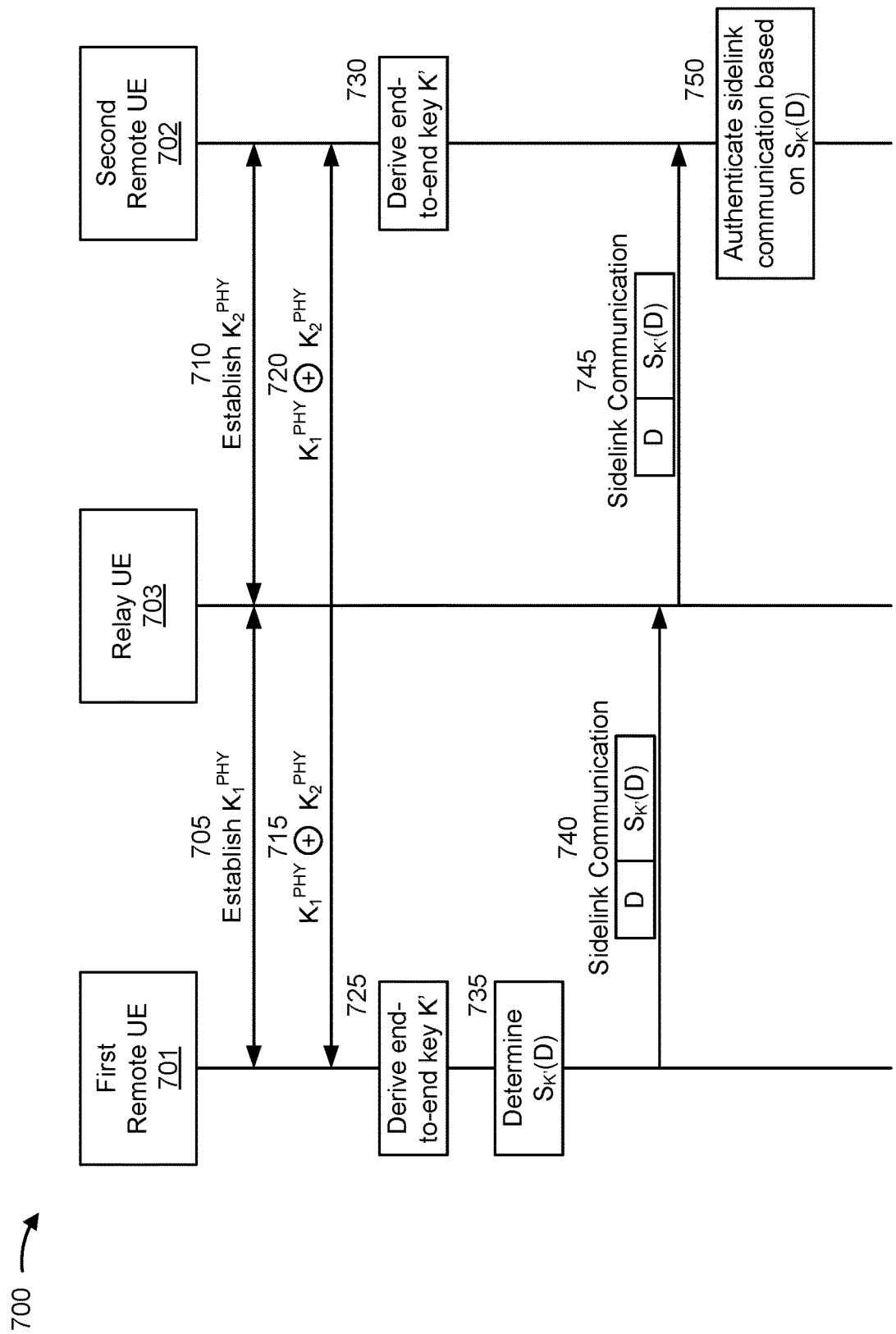

FIG. 7 is a diagram illustrating an example 700 associated with PHY layer security for UE-to-UE relays, in accordance with the present disclosure. As shown in FIG. 7, example 700 includes communication between a first remote UE 701, a second remote UE 702, and a relay UE 703. In some aspects, the first remote UE 701, the second remote UE 702, and the relay UE 703 may correspond to one or more other UEs described elsewhere herein, such as UE 120. In some aspects, the first remote UE 701, the second remote UE 702, and the relay UE 703 may communicate via sidelink communications (e.g., over a PC5 interface). As shown in example 700, in some aspects, the relay UE 703 may facilitate end-to-end PHY layer security for sidelink data relayed between the first remote UE 701 and the second remote UE 702 by facilitating an end-to-end remote key agreement between the first remote UE 701 and the second remote UE 702.

As shown in FIG. 7, and by reference number 705, the relay UE 703 and the first remote UE 701 may establish a first PHY layer key $K_1^{PHY}$ based at least in part on a first link key $K_1$ associated with a first link between the first remote UE 701 and the relay UE 703. The first link key $K_1$ may be an established higher layer (e.g., PDCP layer) key for the first link between the first remote UE 701 and the relay UE 703. In some aspects, the first remote UE 701 and the relay UE 703 may each derive the first PHY layer key $K_1^{PHY}$ as $K_1^{PHY} = KDF(K_1, \text{slot } \#)$, as described above in connection with FIG. 6.

As shown in FIG. 7, and by reference number 710, the relay UE 703 and the second remote UE 702 may establish a second PHY layer key $K_2^{PHY}$ based at least in part on a second link key $K_2$ associated with a second link between the second remote UE 702 and the relay UE 703. The second link key $K_2$ may be an established higher layer (e.g., PDCP layer) key for the second link between the second remote UE 702 and the relay UE 703. In some aspects, the second remote UE 702 and the relay UE 703 may each derive the second PHY layer key $K_2^{PHY}$ as $K_2^{PHY} = KDF(K_2, \text{slot } \#)$, as described above in connection with FIG. 6.

As shown in FIG. 7, and by reference number 715, the relay UE 703 may transmit, to the first remote UE 701, an indication of a combined PHY layer key that combines the first PHY layer key $K_1^{PHY}$ and the second PHY layer key $K_2^{PHY}$. As shown by reference number 720, the relay UE 703 may transmit, to the second remote UE 702, an indication of the combined PHY layer key that combines the first PHY layer key $K_1^{PHY}$ and the second PHY layer key $K_2^{PHY}$. In some aspects, the relay UE 703 may combine the first PHY layer key $K_1^{PHY}$ and the second PHY layer key $K_2^{PHY}$ using an exclusive OR (XOR) operation (e.g., a bitwise XOR operation), to generate the combined PHY layer key as $K^{PHY} = K_1^{PHY} \oplus K_2^{PHY}$. By transmitting the combined PHY layer key $K_1^{PHY} \oplus K_2^{PHY}$ to the first remote UE 701 and the second remote UE 702, the relay UE 703 may facilitate an end-to-end remote key agreement between the first remote UE 701 and the second remote UE 702. As the first remote UE 701 has already established the first PHY layer key $K_1^{PHY}$, the first remote UE 701 may derive/decode the second PHY layer key $K_2^{PHY}$ from the combined PHY layer key $K_1^{PHY} \oplus K_2^{PHY}$. Similarly, as the second remote UE 702 has already established the second PHY layer key $K_2^{PHY}$, the second remote UE 702 may derive/decode the first PHY layer key $K_1^{PHY}$ from the combined PHY layer key $K_1^{PHY} \oplus K_2^{PHY}$. As a result, the first remote UE 701 and the second remote UE 702 may each be aware of $K_1^{PHY}$ and $K_2^{PHY}$. In addition, transmitting the combined PHY layer key $K_1^{PHY} \oplus K_2^{PHY}$, by the relay UE 703, does not compromise the security of the first link or the second link because a UE other than the first remote UE 701 and the second remote UE 702 may not be able to decode $K_1^{PHY} \oplus K_2^{PHY}$ without having already established $K_1^{PHY}$ or $K_2^{PHY}$.

As further shown in FIG. 7, and by reference number 725, the first remote UE 701 may derive an end-to-end key K' (e.g., an end-to-end PHY layer key) based at least in part on $K_1^{PHY}$ and $K_2^{PHY}$. For example, the first remote UE 701 may derive the end-to-end key K' as $K'=f(K_1^{PHY}, K_1^{PHY})$, where $f$ is a key derivation function. As shown by reference number 730, the second remote UE 702 may derive the end-to-end key K'. For example, the first remote UE 701 may derive the end-to-end key K' as $K'=f(K_1^{PHY}, K_2^{PHY})$. In this case, the first remote UE 701 and the second remote UE 702 may derive the same key K' to be used for end-to-end PHY layer security for sidelink communications between the first remote UE 701 and the second remote UE 702 (via the relay UE 703) based at least in part on the shared knowledge of $K_1^{PHY}$ and $K_2^{PHY}$ facilitated by the relay UE 703.

As shown in FIG. 7, and by reference number 735, the first remote UE 701 may determine a message authentication code $s_{K'}$ for sidelink data to be transmitted from the first remote UE 701 to the relay UE 703, and relayed from the relay UE 703 to the second remote UE 702. In some aspects, the first remote UE 701 may determine the message authentication code message authentication code $s_{K'}(D)$ for sidelink data D (e.g., PHY layer data) to be transmitted, based at least in part on the end-to-end key K' and the sidelink data D, as $s_{K'}(D)=f(K', D)$, where $f$ may be any standardized one-way mapping function.

As shown in FIG. 7, and by reference number 740, the first remote UE 701 may transmit, to the relay UE 703, a sidelink communication that includes the sidelink data D and the message authentication code $s_{K'}(D)$. For example, the first sidelink communication may be a sidelink message (e.g., $d=[D, s_{K'}(D)]$) in which the message authentication code $s_{K'}(D)$ is included with the sidelink data D. The relay UE 703 may receive the sidelink communication transmitted by the first remote UE 701.

As shown in FIG. 7, and by reference number 745, the relay UE 703 may forward the sidelink communication, including the sidelink data D and the message authentication code $s_{K'}(D)$, to the second remote UE 702. In some aspects, the relay UE 703 may decode only the control information (e.g., the SCI), in the sidelink communication, to determine whether the destination ID is associated with a remote UE (e.g., the second remote UE 702), and if so, forward the sidelink communication to the remote UE (e.g., the second remote UE 702). In this case, the relay UE 703 may not incur overhead associated with decoding the sidelink data, performing authentication, determining a new message authentication code, and/or re-encoding the sidelink data.

The second remote UE 702 may receive the sidelink communication forwarded by the relay UE 703. As shown in FIG. 7, and by reference number 750, the second remote UE 702 may authenticate the sidelink communication based at least in part on the on the message authentication code $s_{K'}(D)$. In some aspects, the second remote UE 702 may use the end-to-end key K' to determine a derived message authentication code $\widehat{s_{K'}}=f(K', D)$ from the data D received in the sidelink communication and the end-to-end key K'. The second remote UE 702 may authenticate the sidelink communication by comparing the derived message authentication code $\widehat{s_{K'}}$ with the message authentication code $s_{K'}$ included in the sidelink communication to verify whether the derived message authentication code $\widehat{s_{K'}}$ matches the message authentication code $s_{K'}$ included in the first sidelink communication. In some aspects, the second remote UE 702 may determine that the sidelink communication is valid when the derived message authentication code $\widehat{s_{K'}}$ matches the received message authentication code $s_{K'}$.

As indicated above, FIG. 7 is provided as an example. Other examples may differ from what is described with respect to FIG. 7.

Figure 8:
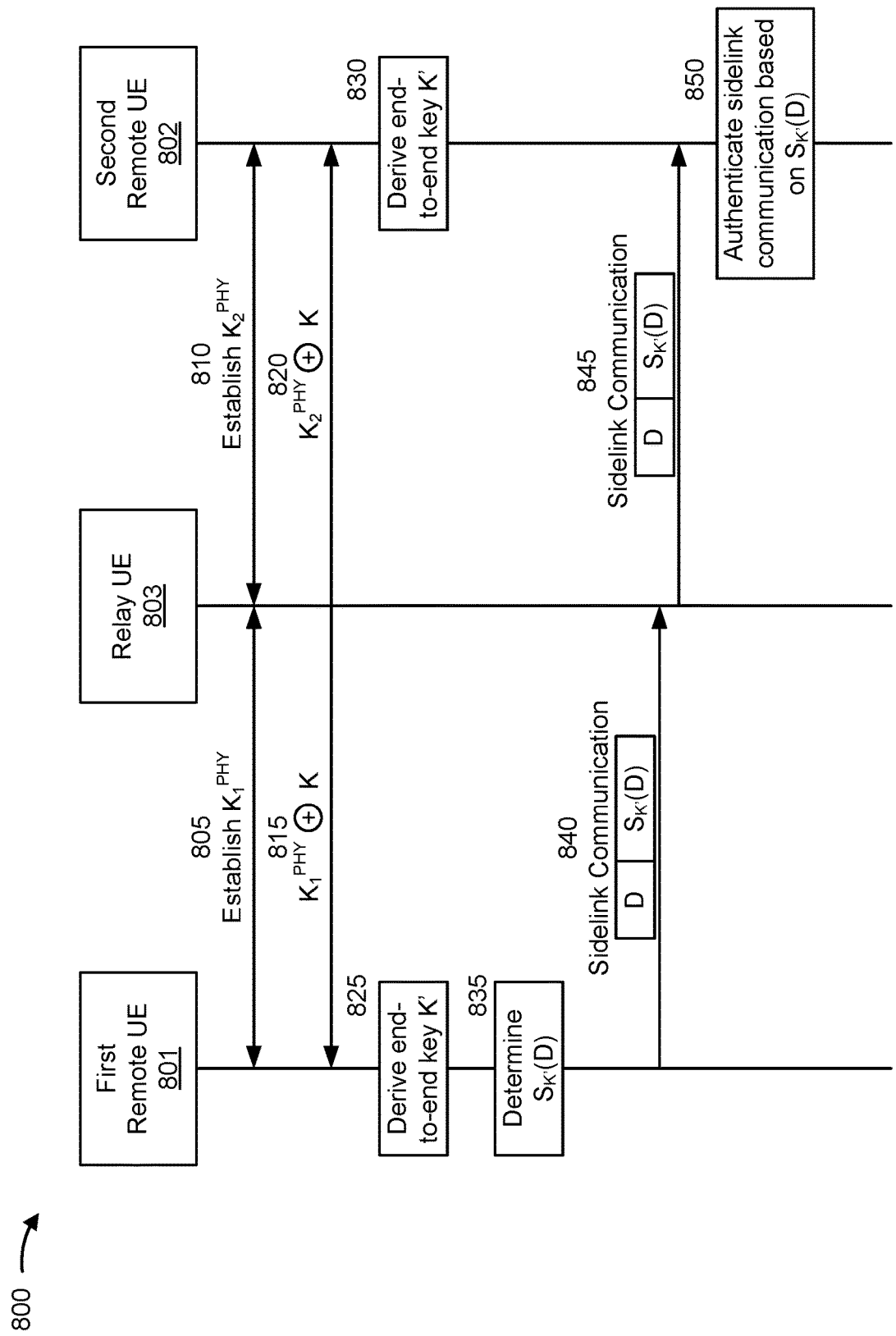

FIG. 8 is a diagram illustrating an example 800 associated with PHY layer security for UE-to-UE relays, in accordance with the present disclosure. As shown in FIG. 8, example 800 includes communication between a first remote UE 801, a second remote UE 802, and a relay UE 803. In some aspects, the first remote UE 801, the second remote UE 802, and the relay UE 803 may correspond to one or more other UEs described elsewhere herein, such as UE 120. In some aspects, the first remote UE 801, the second remote UE 802, and the relay UE 803 may communicate via sidelink communications (e.g., over a PC5 interface). As shown in example 800, in some aspects, the relay UE 803 may facilitate end-to-end PHY layer security for sidelink data relayed between the first remote UE 801 and the second remote UE 802 by facilitating an end-to-end remote key agreement between the first remote UE 801 and the second remote UE 802.

As shown in FIG. 8, and by reference number 805, the relay UE 803 and the first remote UE 801 may establish a first PHY layer key $K_1^{PHY}$ based at least in part on a first link key $K_1$ associated with a first link between the first remote UE 801 and the relay UE 803. The first link key $K_1$ may be an established higher layer (e.g., PDCP layer) key for the first link between the first remote UE 801 and the relay UE 803. In some aspects, the first remote UE 801 and the relay UE 803 may each derive the first PHY layer key $K_1^{PHY}$ as $K_1^{PHY}=KDF(K_1, \text{slot \#})$, as described above in connection with FIG. 6.

As shown in FIG. 8, and by reference number 810, the relay UE 803 and the second remote UE 802 may establish a second PHY layer key $K_2^{PHY}$ based at least in part on a second link key $K_2$ associated with a second link between the second remote UE 802 and the relay UE 803. The second link key $K_2$ may be an established higher layer (e.g., PDCP layer) key for the second link between the second remote UE 802 and the relay UE 803. In some aspects, the second remote UE 802 and the relay UE 803 may each derive the second PHY layer key $K_2^{PHY}$ as $K_2^{PHY}=KDF(K_2, \text{slot \#})$, as described above in connection with FIG. 6.

As shown in FIG. 8, and by reference number 815, the relay UE 803 may transmit, to the first remote UE 801, an indication of a first combined PHY layer key that combines the first PHY layer key $K_1^{PHY}$ and an end-to-end key K. In some aspects, the relay UE 803 may determine or select the end-to-end key K (e.g., to be used for providing end-to-end PHY layer security between the first remote UE 801 and the second remote UE 802). For example, the key K may be determined, by the relay UE 803, independently with respect to the link keys $K_1$ and $K_2$. In some aspects, the relay UE 803 may combine the first PHY layer key $K_1^{PHY}$ and the end-to-end key K using the XOR operation (e.g., a bitwise XOR operation), to generate the first combined PHY layer key as $K_1^{PHY} \oplus K$.

As shown in FIG. 8, and by reference number 820, the relay UE 803 may transmit, to the second remote UE 802, an indication of a second combined PHY layer key that combines the second PHY layer key $K_2^{PHY}$ and the end-to-end key K. In some aspects, the relay UE 803 may combine the second PHY layer key $K_2^{PHY}$ and the end-to-end key K using the XOR operation (e.g., a bitwise XOR operation), to generate the second combined PHY layer key as $K_2^{PHY} \oplus K$. In some aspects, by transmitting the independent key K combined with $K_1^{PHY}$ to the first remote UE 801, and transmitting the independent key K combined with $K_2^{PHY}$ to the second remote UE 802, the relay UE 803 may enable the first remote UE 801 and the second remote UE 802 to each decode the same independent key K, and thus may facilitate an end-to-end remote key agreement between the first remote UE 801 and the second remote UE 802.

As shown in FIG. 8, and by reference number 825, the first remote UE 801 may derive an end-to-end key K' based at least in part on the first combined PHY layer key $K_1^{PHY} \oplus K$. For example, the first remote UE 801 may use the use the end-to-end key K'=K provided in the first combined PHY layer key $K_1^{PHY} \oplus K$. As shown by reference number 830, the second remote UE 802 may derive the end-to-end key K' based at least in part on the second combined PHY layer key $K_2^{PHY} \oplus K$. For example, the second remote UE 802 may use the use the end-to-end key K'=K provided in the second combined PHY layer key $K_2^{PHY} \oplus K$. In this case, the first remote UE 801 and the second remote UE 802 may derive the same key K'=K to be used for end-to-end PHY layer security for sidelink communications between the first remote UE 801 and the second remote UE 802 (via the relay UE 803).

As shown in FIG. 8, and by reference number 835, the first remote UE 801 may determine a message authentication code $s_K$, for sidelink data to be transmitted from the first remote UE 801 to the relay UE 803, and relayed from the relay UE 803 to the second remote UE 802. In some aspects, the first remote UE 801 may determine the message authentication code message authentication code $s_{K'}(D)$ for sidelink data D (e.g., PHY layer data) to be transmitted, based at least in part on the end-to-end key K' and the sidelink data D, as $s_{K'}(D) = f(K', D)$, where $f$ may be any standardized one-way mapping function.

As shown in FIG. 8, and by reference number 840, the first remote UE 801 may transmit, to the relay UE 803, a sidelink communication that includes the sidelink data D and the message authentication code $s_{K'}(D)$. For example, the first sidelink communication may be a sidelink message (e.g., d=[D, $s_{K'}(D)$]) in which the message authentication code $s_{K'}(D)$ is included with the sidelink data D. The relay UE 803 may receive the sidelink communication transmitted by the first remote UE 801.

As shown in FIG. 8, and by reference number 845, the relay UE 803 may forward the sidelink communication, including the sidelink data D and the message authentication code $s_{K'}(D)$, to the second remote UE 802. In some aspects, the relay UE 803 may decode only the control information (e.g., the SCI), in the sidelink communication, to determine whether the destination ID is associated with a remote UE (e.g., the second remote UE 802), and if so, forward the sidelink communication to the remote UE (e.g., the second remote UE 802). In this case, the relay UE 803 may not incur overhead associated with decoding the sidelink data, performing authentication, determining a new message authentication code, and/or re-encoding the sidelink data.

The second remote UE 802 may receive the sidelink communication forwarded by the relay UE 803. As shown in FIG. 8, and by reference number 850, the second remote UE 802 may authenticate the sidelink communication based at least in part on the on the message authentication code $s_{K'}(D)$. In some aspects, the second remote UE 802 may use the end-to-end key K' to determine a derived message authentication code $\widehat{s_{K'}} = f(K', D)$ from the data D received in the sidelink communication and the end-to-end key K'. The second remote UE 802 may authenticate the sidelink communication by comparing the derived message authentication code $\widehat{s_{K'}}$ with the message authentication code $s_{K'}$ included in the sidelink communication to verify whether the derived message authentication code $\widehat{s_{K'}}$ matches the message authentication code $s_{K'}$ included in the first sidelink communication. In some aspects, the second remote UE 802 may determine that the sidelink communication is valid when the derived message authentication code $\widehat{s_{K'}}$ matches the received message authentication code $s_{K'}$.

As indicated above, FIG. 8 is provided as an example. Other examples may differ from what is described with respect to FIG. 8.

Figure 9:
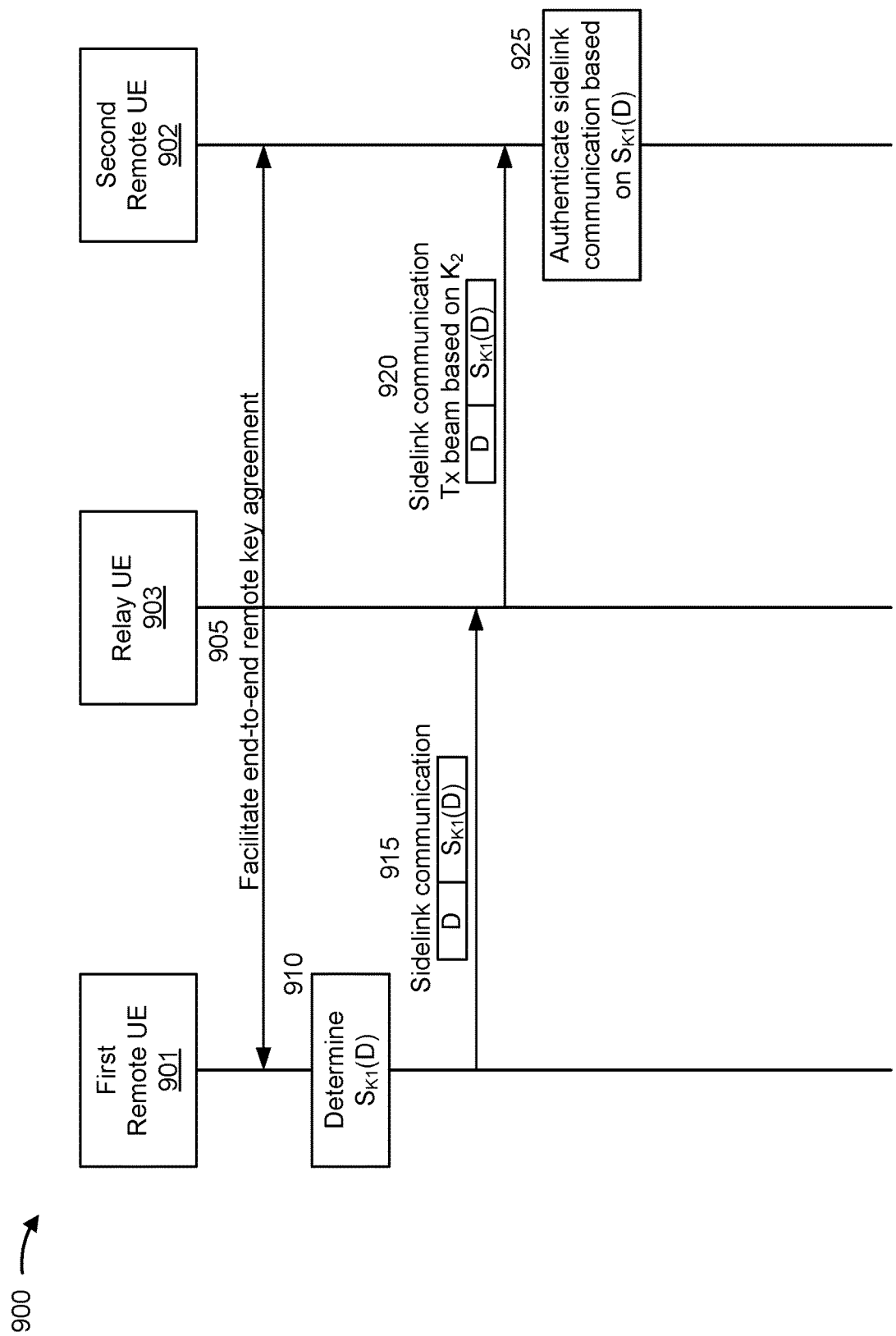

FIG. 9 is a diagram illustrating an example 900 associated with PHY layer security for UE-to-UE relays, in accordance with the present disclosure. As shown in FIG. 9, example 900 includes communication between a first remote UE 901, a second remote UE 902, and a relay UE 903. In some aspects, the first remote UE 901, the second remote UE 902, and the relay UE 903 may correspond to one or more other UEs described elsewhere herein, such as UE 120. In some aspects, the first remote UE 901, the second remote UE 902, and the relay UE 903 may communicate via sidelink communications (e.g., over a PC5 interface).

As shown in example 900, in some aspects, the relay UE 903 may facilitate end-to-end PHY layer security for sidelink data relayed between the first remote UE 901 and the second remote UE 902 using hybrid digital and analog secure verification. For example, a digital signature may be transmitted (e.g., by the first remote UE 901) based at least in part on a key associated with the first hop (e.g., the first link between the first remote UE 901 and the relay UE 903), and the PHY data (D), and the digital signature may be transmitted by the relay UE 903 in a particular beam direction based at least in part on a key associated with the second hop (e.g., the second link between the relay UE 903 and the second remote UE 902). In this case, the relay UE 903 may act similarly to a repeater or a reconfigurable intelligent surface (RIS) when forwarding the PHY data (D) and the digital signature in a certain beam direction.

As shown in FIG. 9, and by reference number 905, the relay UE 903 may facilitate an end-to-end remote key agreement based at least in part on the first established link key $K_1$ associated with the first link between the first remote UE 901 and the relay UE 903 and the second established link key associated with the $K_2$. For example, the relay UE 903 may transmit a combined key including $K_1$ and $K_2$ (or $K_1^{PHY}$ and $K_2^{PHY}$) to the first remote UE 901 and the second remote UE 902. Based at least in part on receiving the combined key, the first remote UE 901 may determine $K_2$ (or $K_2^{PHY}$) and the second remote UE 902 may determine $K_1$ (or $K_1^{PHY}$). In this way, both the first remote UE 901 and the second remote UE 902 may have a common key agreement, $K=[K_1, K_2]$.

As shown in FIG. 9, and by reference number 910, the first remote UE 901 may determine a message authentication code $s_{K_1}$ for sidelink data to be transmitted from the first remote UE 601 to the relay UE 603, and relayed from the relay UE 603 to the second remote UE 602. The message authentication code $s_{K_1}$ may be a digital signature. In some aspects, the message authentication code $s_{K_1}$ determined by the first remote UE 601 may be derived based at least in part on the first link key $K_1$. For example, the first remote UE 601 may determine the first message authentication code $s_{K_1}(D)$ for sidelink data D (e.g., PHY layer data) to be transmitted, based at least in part on $K_1$, as $s_{K_1}(D) = f(D, K_1)$. In some aspects, the first remote UE 901 may determine $s_{K_1}$ based at least on $K_1^{PHY}$ (which is derived based at least in part on $K_1$), as described above in connection with FIG. 6.

As shown in FIG. 9, and by reference number 915, the first remote UE 901 may transmit, to the relay UE 903, a sidelink communication that includes the sidelink data D and the first message authentication code $s_{K_1}(D)$. For example, the first sidelink communication may be a sidelink message, d=[D, $s_{K_1}(D)$]), in which the message authentication code $s_{K_1}(D)$ (e.g., the digital signature) is included with the sidelink data D. The relay UE 903 may receive the first sidelink communication transmitted by the first remote UE 901.

As shown in FIG. 9, and by reference number 920, the relay UE 903 may forward/transmit the sidelink communication, including the sidelink data D and the message authentication code $s_{K_1}(D)$ on a transmit beam that is based at least in part on the second link key $K_2$ associated with the second link between the relay UE 903 and the second remote UE 902. For example, the relay UE 903 may select the transmit beam for transmitting the sidelink communication, including the sidelink data D and the message authentication code $s_{K_1}(D)$, based at least in part on the second link key $K_2$. In some aspects, the relay UE 903 may forward the sidelink communication d=[D, $s_{K_1}$ (D)] only on a specific transmit beam that depends on the second link key $K_2$. In some aspects, the relay UE 903 may select, as the transmit beam for transmitting the sidelink communication to the second remote UE 902, a transmit beam associated with the second link key $K_2$ at a time at which the sidelink communication is transmitted. For example, based at last in part on $K_2$, at different time instants, the sidelink communication d may be transmitted by the relay UE 903 only on a specific transmit beam, and the specific transmit beam that is associated with $K_2$ may vary between different transmit beams at different times. In this case, the second remote UE 902 may use a corresponding receive beam (e.g., a receive beam associated with $K_2$ at a particular time) to receive the sidelink communication from the relay UE 903.

As shown in FIG. 9, and by reference number 925, the second remote UE 902 may authenticate the sidelink communication based at least in part on the on the message authentication code $s_{K_1}(D)$. The second remote UE 902 may be aware of the first link key $K_1$ due to the common key agreement between the first remote UE 901 and the second remote UE 902. In some aspects, the second remote UE 902 may determine a derived message authentication code $\widehat{s_{K_1}} = f(D, K_1)$ from the data D received in the sidelink communication and the first link key $K_1$. The second remote UE 902 may authenticate the sidelink communication by comparing the derived message authentication code $\widehat{s_{K_1}}$ with the message authentication code $s_{K_1}$ included in the sidelink communication to verify whether the derived message authentication code $\widehat{s_{K_1}}$ matches the message authentication code $s_{K_1}$ included in the first sidelink communication. In some aspects, the second remote UE 902 may determine that the sidelink communication is valid when the derived message authentication code $\widehat{s_{K_1}}$ matches the received message authentication code $s_{K_1}$.

As indicated above, FIG. 9 is provided as an example. Other examples may differ from what is described with respect to FIG. 9.

Figure 10:
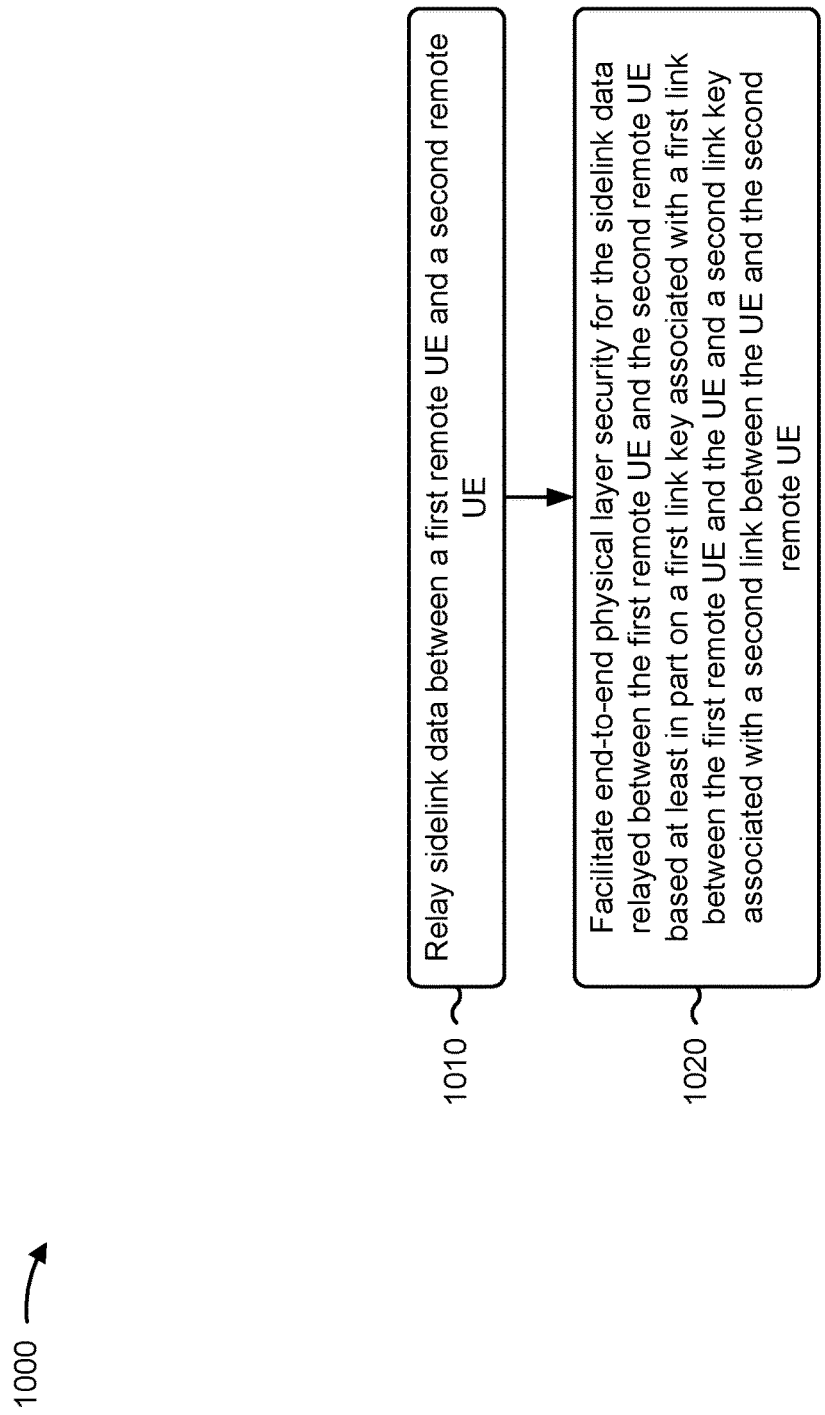
FIG. 10 is a diagram illustrating an example process associated with physical layer security for UE-to-UE relays, in accordance with the present disclosure.

FIG. 10 is a diagram illustrating an example process 1000 performed, for example, by a UE, in accordance with the present disclosure. Example process 1000 is an example where the UE (e.g., UE 120, relay UE 603, relay UE 703, relay UE 803, and/or relay UE 903) performs operations associated with PHY layer security for UE-to-UE relays.

As shown in FIG. 10, in some aspects, process 1000 may include relaying sidelink data between a first remote UE and a second remote UE (block 1010). For example, the UE (e.g., using communication manager 140, reception component 1102, and/or transmission component 1104, depicted in FIG. 11) may relay sidelink data between a first remote UE and a second remote UE, as described above.

As further shown in FIG. 10, in some aspects, process 1000 may include facilitating end-to-end physical layer security for the sidelink data relayed between the first remote UE and the second remote UE based at least in part on a first link key associated with a first link between the first remote UE and the UE and a second link key associated with a second link between the UE and the second remote UE (block 1020). For example, the UE (e.g., using communication manager 140 and/or security component 1108, depicted in FIG. 11) may facilitate end-to-end physical layer security for the sidelink data relayed between the first remote UE and the second remote UE based at least in part on a first link key associated with a first link between the first remote UE and the UE and a second link key associated with a second link between the UE and the second remote UE, as described above.

Process 1000 may include additional aspects, such as any single aspect or any combination of aspects described below and/or in connection with one or more other processes described elsewhere herein.

In a first aspect, relaying the sidelink data between the first remote UE and the second remote UE includes receiving, from the first remote UE, a first sidelink communication including the sidelink data and a first message authentication code based at least in part on the sidelink data and the first link key, and transmitting, to the second remote UE, a second sidelink communication including the sidelink data and a second message authentication code based at least in part on the sidelink data and the second link key.

In a second aspect, facilitating end-to-end physical layer security for the sidelink data relayed between the first remote UE and the second remote UE includes determining a derived first message authentication code based at least in part on the sidelink data included in the first sidelink communication and the first link key, verifying that the derived first message authentication code matches the first message authentication code included in the first sidelink communication, and determining, in connection with verifying that the derived first message authentication code matches the first message authentication code included in the first sidelink communication, the second message authentication code based at least in part on the sidelink data and the second link key.

In a third aspect, transmitting the second sidelink communication including the sidelink data and the second message authentication code includes transmitting, to the second remote UE, the second sidelink communication including the sidelink data and the second message authentication code in connection with verifying that the derived first message authentication code matches the first message authentication code included in the first sidelink communication.

In a fourth aspect, the first message authentication code is based at least in part on the sidelink data and a first physical layer key derived from the first link key, and the second message authentication code is based at least in part on the sidelink data and a second physical layer key derived from the second link key.

In a fifth aspect, the first link key is a first higher layer key associated with the first link between the first remote UE and the UE, and the second link key is a second higher layer key associated with the second link between the UE and the second remote UE.

In a sixth aspect, facilitating end-to-end physical layer security for the sidelink data relayed between the first remote UE and the second remote UE includes facilitating an end-to-end remote key agreement between the first remote UE and the second remote UE.

In a seventh aspect, facilitating the end-to-end remote key agreement between the first remote UE and the second remote UE includes transmitting, to the first remote UE, an indication of a combined physical layer key that combines a first physical layer key derived from the first link key and a second physical layer key derived from the second link key, and transmitting, to the second remote UE, an indication of the combined physical layer key that combines the first physical layer key derived from the first link key and the second physical layer key derived from the second link key.

In an eighth aspect, relaying the sidelink data between the first remote UE and the second remote UE includes receiving, from the first remote UE, a sidelink communication including the sidelink data and a message authentication code based at least in part on the sidelink data and an end-to-end key derived from the first physical layer key and the second physical layer key, and forwarding the sidelink communication, including the sidelink data and the message authentication code, to the second remote UE.

In a ninth aspect, facilitating the end-to-end remote key agreement between the first remote UE and the second remote UE includes transmitting, to the first remote UE, an indication of a first combined physical layer key that combines an end-to-end key and a first physical layer key derived from the first link key, and transmitting, to the second remote UE, an indication of a second combined physical layer key that combines the end-to-end key and a second physical layer key derived from the second link key.

In a tenth aspect, relaying the sidelink data between the first remote UE and the second remote UE includes receiving, from the first remote UE, a sidelink communication including the sidelink data and a message authentication code based at least in part on the sidelink data and the end-to-end key, and forwarding the sidelink communication, including the sidelink data and the message authentication code, to the second remote UE.

In an eleventh aspect, relaying the sidelink data between the first remote UE and the second remote UE includes receiving, from the first remote UE, a sidelink communication including the sidelink data and a digital signature based at least in part on the sidelink data and the first link key, and transmitting, to the second remote UE, the sidelink communication including the sidelink data and the digital signature on a transmit beam based at least in part on the second link key.

In a twelfth aspect, facilitating end-to-end physical layer security for the sidelink data relayed between the first remote UE and the second remote UE further includes selecting the transmit beam for transmitting the sidelink communication, including the sidelink data and the digital signature, to the second remote UE, based at least in part on the second link key.

In a thirteenth aspect, selecting the transmit beam for transmitting the sidelink communication to the second remote UE includes selecting, as the transmit beam for transmitting the sidelink communication to the second remote UE, a transmit beam associated with the second link key at a time at which the sidelink communication is transmitted.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
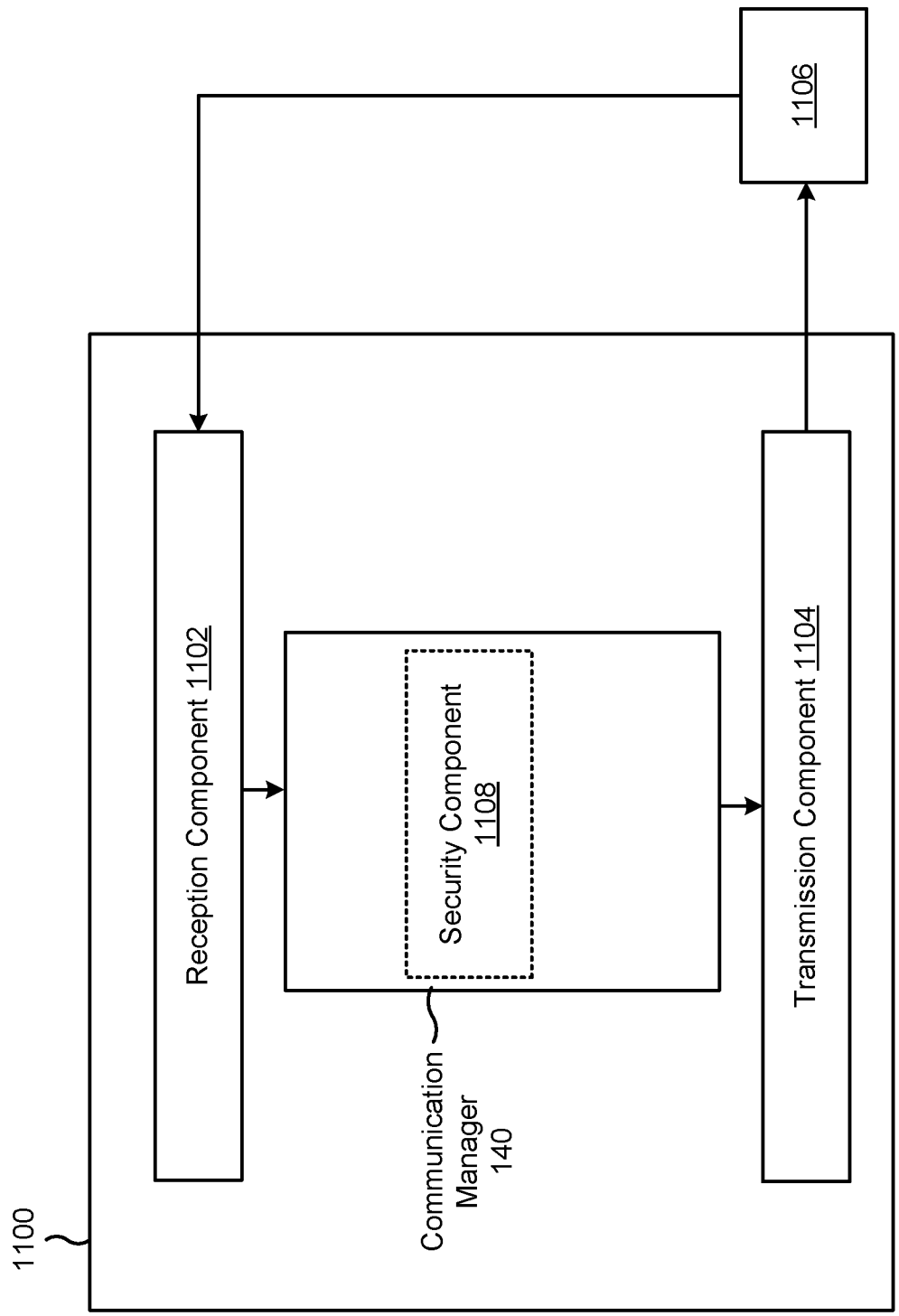
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a security component 1108, among other examples.

In some aspects, the apparatus 1100 may be configured to perform one or more operations described herein in connection with FIGS. 6-9. Additionally, or alternatively, the apparatus 1100 may be configured to perform one or more processes described herein, such as process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 and/or the transmission component 1104 may relay sidelink data between a first remote UE and a second remote UE. The security component 1108 may facilitate end-to-end physical layer security for the sidelink data relayed between the first remote UE and the second remote UE based at least in part on a first link key associated with a first link between the first remote UE and the UE and a second link key associated with a second link between the UE and the second remote UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: relaying sidelink data between a first remote UE and a second remote UE; and facilitating end-to-end physical layer security for the sidelink data relayed between the first remote UE and the second remote UE based at least in part on a first link key associated with a first link between the first remote UE and the UE and a second link key associated with a second link between the UE and the second remote UE.

Aspect 2: The method of Aspect 1, wherein relaying the sidelink data between the first remote UE and the second remote UE comprises: receiving, from the first remote UE, a first sidelink communication including the sidelink data and a first message authentication code based at least in part on the sidelink data and the first link key; and transmitting, to the second remote UE, a second sidelink communication including the sidelink data and a second message authentication code based at least in part on the sidelink data and the second link key.

Aspect 3: The method of Aspect 2, wherein facilitating end-to-end physical layer security for the sidelink data relayed between the first remote UE and the second remote UE comprises: determining a derived first message authentication code based at least in part on the sidelink data included in the first sidelink communication and the first link key; verifying that the derived first message authentication code matches the first message authentication code included in the first sidelink communication; and determining, in connection with verifying that the derived first message authentication code matches the first message authentication code included in the first sidelink communication, the second message authentication code based at least in part on the sidelink data and the second link key.

Aspect 4: The method of Aspect 3, wherein transmitting the second sidelink communication including the sidelink data and the second message authentication code comprises: transmitting, to the second remote UE, the second sidelink communication including the sidelink data and the second message authentication code in connection with verifying that the derived first message authentication code matches the first message authentication code included in the first sidelink communication.

Aspect 5: The method of any of Aspects 3-4, wherein the first message authentication code is based at least in part on the sidelink data and a first physical layer key derived from the first link key, and wherein the second message authentication code is based at least in part on the sidelink data and a second physical layer key derived from the second link key.

Aspect 6: The method of Aspect 5, wherein the first link key is a first higher layer key associated with the first link between the first remote UE and the UE, and wherein the second link key is a second higher layer key associated with the second link between the UE and the second remote UE.

Aspect 7: The method of Aspect 1, wherein facilitating end-to-end physical layer security for the sidelink data relayed between the first remote UE and the second remote UE comprises: facilitating an end-to-end remote key agreement between the first remote UE and the second remote UE.

Aspect 8: The method of Aspect 7, wherein facilitating the end-to-end remote key agreement between the first remote UE and the second remote UE comprises: transmitting, to the first remote UE, an indication of a combined physical layer key that combines a first physical layer key derived from the first link key and a second physical layer key derived from the second link key; and transmitting, to the second remote UE, an indication of the combined physical layer key that combines the first physical layer key derived from the first link key and the second physical layer key derived from the second link key.

Aspect 9: The method of Aspect 8, wherein relaying the sidelink data between the first remote UE and the second remote UE comprises: receiving, from the first remote UE, a sidelink communication including the sidelink data and a message authentication code based at least in part on the sidelink data and an end-to-end key derived from the first physical layer key and the second physical layer key; and forwarding the sidelink communication, including the sidelink data and the message authentication code, to the second remote UE.

Aspect 10: The method of Aspect 7, wherein facilitating the end-to-end remote key agreement between the first remote UE and the second remote UE comprises: transmitting, to the first remote UE, an indication of a first combined physical layer key that combines an end-to-end key and a first physical layer key derived from the first link key; and transmitting, to the second remote UE, an indication of a second combined physical layer key that combines the end-to-end key and a second physical layer key derived from the second link key.

Aspect 11: The method of Aspect 10, wherein relaying the sidelink data between the first remote UE and the second remote UE comprises: receiving, from the first remote UE, a sidelink communication including the sidelink data and a message authentication code based at least in part on the sidelink data and the end-to-end key; and forwarding the sidelink communication, including the sidelink data and the message authentication code, to the second remote UE.

Aspect 12: The method of Aspect 7, wherein relaying the sidelink data between the first remote UE and the second remote UE comprises: receiving, from the first remote UE, a sidelink communication including the sidelink data and a digital signature based at least in part on the sidelink data and the first link key; and transmitting, to the second remote UE, the sidelink communication including the sidelink data and the digital signature on a transmit beam based at least in part on the second link key.

Aspect 13: The method of Aspect 12, wherein facilitating end-to-end physical layer security for the sidelink data relayed between the first remote UE and the second remote UE further comprises: selecting the transmit beam for transmitting the sidelink communication, including the sidelink data and the digital signature, to the second remote UE, based at least in part on the second link key.

Aspect 14: The method of Aspect 13, wherein selecting the transmit beam for transmitting the sidelink communication to the second remote UE comprises: selecting, as the transmit beam for transmitting the sidelink communication to the second remote UE, a transmit beam associated with the second link key at a time at which the sidelink communication is transmitted.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured individually or collectively to:

relay sidelink data between a first remote UE and a second remote UE; and facilitate end-to-end physical layer security for the sidelink data relayed between the first remote UE and the second remote UE based at least in part on a first physical layer key derived from a first link key associated with a first link between the first remote UE and the UE and a second physical layer key derived from a second link key associated with a second link between the UE and the second remote UE.

2. The UE of claim 1, wherein the one or more processors, to relay the sidelink data between the first remote UE and the second remote UE, are configured individually or collectively to:

receive, from the first remote UE, a first sidelink communication including the sidelink data and a first message authentication code based at least in part on the sidelink data and the first link key; and transmit, to the second remote UE, a second sidelink communication including the sidelink data and a second message authentication code based at least in part on the sidelink data and the second link key.

3. The UE of claim 2, wherein the one or more processors, to facilitate end-to-end physical layer security for the sidelink data relayed between the first remote UE and the second remote UE, are configured individually or collectively to:

determine a derived first message authentication code based at least in part on the sidelink data included in the first sidelink communication and the first link key;

verify that the derived first message authentication code matches the first message authentication code included in the first sidelink communication; and determine, in connection with verifying that the derived first message authentication code matches the first message authentication code included in the first sidelink communication, the second message authentication code based at least in part on the sidelink data and the second link key.

4. The UE of claim 3, wherein the one or more processors, to transmit the second sidelink communication, are configured individually or collectively to:

transmit, to the second remote UE, the second sidelink communication in connection with verifying that the derived first message authentication code matches the first message authentication code included in the first sidelink communication.

5. The UE of claim 3, wherein the first message authentication code is based at least in part on the sidelink data and the first physical layer key, and wherein the second message authentication code is based at least in part on the sidelink data and the second physical layer key.

6. The UE of claim 5, wherein the first link key is a first higher layer key associated with the first link, and wherein the second link key is a second higher layer key associated with the second link.

7. The UE of claim 1, wherein the one or more processors, to facilitate end-to-end physical layer security for the sidelink data relayed between the first remote UE and the second remote UE, are configured individually or collectively to:

facilitate an end-to-end remote key agreement between the first remote UE and the second remote UE.

8. The UE of claim 7, wherein the one or more processors, to facilitate the end-to-end remote key agreement between the first remote UE and the second remote UE, are configured individually or collectively to:

transmit, to the first remote UE, an indication of a combined physical layer key that combines the first physical layer key and the second physical layer key, or transmit, to the second remote UE, an indication of the combined physical layer key.

9. The UE of claim 8, wherein the one or more processors, to relay the sidelink data between the first remote UE and the second remote UE, are configured individually or collectively to:

receive, from the first remote UE, a sidelink communication including the sidelink data and a message authentication code based at least in part on the sidelink data and an end-to-end key derived from the first physical layer key and the second physical layer key; and forward the sidelink communication, including the sidelink data and the message authentication code, to the second remote UE.

10. The UE of claim 7, wherein the one or more processors, to facilitate the end-to-end remote key agreement between the first remote UE and the second remote UE, are configured individually or collectively to:

transmit, to the first remote UE, an indication of a first combined physical layer key that combines an end-to-end key and the first physical layer key; and transmit, to the second remote UE, an indication of a second combined physical layer key that combines the end-to-end key and the second physical layer key.

11. The UE of claim 10, wherein the one or more processors, to relay the sidelink data between the first remote UE and the second remote UE, are configured individually or collectively to:

receive, from the first remote UE, a sidelink communication including the sidelink data and a message authentication code based at least in part on the sidelink data and the end-to-end key; and forward the sidelink communication, including the sidelink data and the message authentication code, to the second remote UE.

12. The UE of claim 1, wherein the one or more processors, to relay the sidelink data between the first remote UE and the second remote UE, are configured individually or collectively to:

receive, from the first remote UE, a sidelink communication including the sidelink data and a digital signature based at least in part on the sidelink data and the first link key; and transmit, to the second remote UE, the sidelink communication including the sidelink data and the digital signature on a transmit beam based at least in part on the second link key.

13. The UE of claim 12, wherein the one or more processors, to facilitate end-to-end physical layer security for the sidelink data relayed between the first remote UE and the second remote UE, are configured individually or collectively to:

select the transmit beam for transmitting the sidelink communication, including the sidelink data and the digital signature, to the second remote UE, based at least in part on the second link key.

14. The UE of claim 13, wherein the one or more processors, to select the transmit beam for transmitting the sidelink communication to the second remote UE, are configured individually or collectively to:

select, as the transmit beam for transmitting the sidelink communication to the second remote UE, a transmit beam associated with the second link key at a time at which the sidelink communication is transmitted.

15. A method of wireless communication performed by a user equipment (UE), comprising:
relaying sidelink data between a first remote UE and a second remote UE; and
facilitating end-to-end physical layer security for the sidelink data relayed between the first remote UE and the second remote UE based at least in part on a first physical layer key derived from a first link key associated with a first link between the first remote UE and the UE and a second physical layer key derived from a second link key associated with a second link between the UE and the second remote UE.

16. The method of claim 15, wherein relaying the sidelink data between the first remote UE and the second remote UE comprises:
receiving, from the first remote UE, a first sidelink communication including the sidelink data and a first message authentication code based at least in part on the sidelink data and the first link key; and
transmitting, to the second remote UE, a second sidelink communication including the sidelink data and a second message authentication code based at least in part on the sidelink data and the second link key.

17. The method of claim 16, wherein facilitating end-to-end physical layer security for the sidelink data relayed between the first remote UE and the second remote UE comprises:
determining a derived first message authentication code based at least in part on the sidelink data included in the first sidelink communication and the first link key;
verifying that the derived first message authentication code matches the first message authentication code included in the first sidelink communication; and
determining, in connection with verifying that the derived first message authentication code matches the first message authentication code included in the first sidelink communication, the second message authentication code based at least in part on the sidelink data and the second link key.

18. The method of claim 17, wherein transmitting the second sidelink communication comprises:
transmitting, to the second remote UE, the second sidelink communication in connection with verifying that the derived first message authentication code matches the first message authentication code included in the first sidelink communication.

19. The method of claim 17, wherein the first message authentication code is based at least in part on the sidelink data and the first physical layer key, and wherein the second message authentication code is based at least in part on the sidelink data and the second physical layer key.

20. The method of claim 19, wherein the first link key is a first higher layer key associated with the first link, and wherein the second link key is a second higher layer key associated with the second link.

21. The method of claim 15, wherein facilitating end-to-end physical layer security for the sidelink data relayed between the first remote UE and the second remote UE comprises:
facilitating an end-to-end remote key agreement between the first remote UE and the second remote UE.

22. The method of claim 21, wherein facilitating the end-to-end remote key agreement between the first remote UE and the second remote UE comprises:
transmitting, to the first remote UE, an indication of a combined physical layer key that combines the first physical layer key and the second physical layer key, or
transmitting, to the second remote UE, an indication of the combined physical layer key.

23. The method of claim 22, wherein relaying the sidelink data between the first remote UE and the second remote UE comprises:
receiving, from the first remote UE, a sidelink communication including the sidelink data and a message authentication code based at least in part on the sidelink data and an end-to-end key derived from the first physical layer key and the second physical layer key; and
forwarding the sidelink communication, including the sidelink data and the message authentication code, to the second remote UE.

24. The method of claim 21, wherein facilitating the end-to-end remote key agreement between the first remote UE and the second remote UE comprises:
transmitting, to the first remote UE, an indication of a first combined physical layer key that combines an end-to-end key and the first physical layer key; and
transmitting, to the second remote UE, an indication of a second combined physical layer key that combines the end-to-end key and the second physical layer key.

25. The method of claim 24, wherein relaying the sidelink data between the first remote UE and the second remote UE comprises:
receiving, from the first remote UE, a sidelink communication including the sidelink data and a message authentication code based at least in part on the sidelink data and the end-to-end key; and
forwarding the sidelink communication, including the sidelink data and the message authentication code, to the second remote UE.

26. The method of claim 15, wherein relaying the sidelink data between the first remote UE and the second remote UE comprises:
receiving, from the first remote UE, a sidelink communication including the sidelink data and a digital signature based at least in part on the sidelink data and the first link key; and
transmitting, to the second remote UE, the sidelink communication including the sidelink data and the digital signature on a transmit beam based at least in part on the second link key.

27. The method of claim 26, wherein facilitating end-to-end physical layer security for the sidelink data relayed between the first remote UE and the second remote UE further comprises:
selecting the transmit beam for transmitting the sidelink communication, including the sidelink data and the digital signature, to the second remote UE, based at least in part on the second link key.

28. The method of claim 27, wherein selecting the transmit beam for transmitting the sidelink communication to the second remote UE comprises:
selecting, as the transmit beam for transmitting the sidelink communication to the second remote UE, a transmit beam associated with the second link key at a time at which the sidelink communication is transmitted.

29. A non-transitory computer-readable medium storing a set of instructions for wireless communication, the set of instructions comprising:

one or more instructions that, when executed by one or more processors of a user equipment (UE), cause the UE to:
  relay sidelink data between a first remote UE and a second remote UE; and
  facilitate end-to-end physical layer security for the sidelink data relayed between the first remote UE and the second remote UE based at least in part on a first physical layer key derived from a first link key associated with a first link between the first remote UE and the UE and a second physical layer key derived from a second link key associated with a second link between the UE and the second remote UE.

30. An apparatus for wireless communication, comprising:
  a relay circuit to relay sidelink data between a first remote user equipment (UE) and a second remote UE; and
  a security circuit to facilitate end-to-end physical layer security for the sidelink data relayed between the first remote UE and the second remote UE based at least in part on a first physical layer key derived from a first link key associated with a first link between the first remote UE and the apparatus and a second physical layer key derived from a second link key associated with a second link between the apparatus and the second remote UE.

* * * * *